United States Patent [19]

Pattengill et al.

[11] Patent Number: 5,458,091
[45] Date of Patent: Oct. 17, 1995

[54] CLUMPABLE ANIMAL LITTER MIXTURE

[75] Inventors: Maurice G. Pattengill, Golden; Jerry D. Glynn, Aurora; Martin A. Jones, Boulder, all of Colo.

[73] Assignee: Western Aggregates, Inc., Boulder, Colo.

[21] Appl. No.: 323,037

[22] Filed: Oct. 14, 1994

Related U.S. Application Data

[63] Continuation-in-part of Ser. No. 276,516, Jul. 15, 1994, abandoned, which is a continuation-in-part of Ser. No. 210,026, Mar. 16, 1994, abandoned, which is a continuation-in-part of Ser. No. 108,950, Aug. 18, 1993, Pat. No. 5,329,880.

[51] Int. Cl.$^6$ ................................................. A01K 1/015
[52] U.S. Cl. ................................................................. 119/173
[58] Field of Search ........................................ 119/171, 172, 119/173; 502/404, 412

[56] References Cited

U.S. PATENT DOCUMENTS

| | | | |
|---|---|---|---|
| 4,395,357 | 7/1983 | Krämer et al. | 252/428 |
| 4,685,420 | 8/1987 | Stuart | 119/173 |
| 5,059,577 | 10/1991 | Hatton | 502/404 |
| 5,094,189 | 3/1992 | Aylen et al. | 119/173 |
| 5,176,107 | 1/1993 | Bushur | 119/171 |
| 5,183,010 | 2/1993 | Raymond et al. | 119/173 |
| 5,193,489 | 3/1993 | Hardin | 119/173 |
| 5,256,419 | 10/1993 | Roe et al. | 424/407 |
| 5,339,769 | 8/1994 | Toth et al. | 119/173 |
| 5,359,961 | 11/1994 | Goss et al. | 119/173 |
| 5,386,803 | 2/1995 | Hughes | 119/173 |

*Primary Examiner*—Todd E. Manahan
*Attorney, Agent, or Firm*—Blake T. Biederman; Edward A. Steen

[57] ABSTRACT

The invention provides a clumpable animal litter mixture having about 5 to 50 weight percent bentonite, about 0.1 to 25 weight percent gum-containing clumping agent and balance filler particulate. The gum-containing clumping agent is formed from a plant selected from the group consisting of the Plantago and Cydonia families. The clumpable animal litter mixture is pourable into a litter box and agglomerates into a clump upon contact with urine. The clump of the agglomerated bentonite, gum-containing clumping agent, filler particulate and urine is capable of removal with a perforated scoop after as little as one minute of formation. The clumpable mixture is formed by introducing the gum-containing clumping agent into a foam. The gum-containing mixture is mixed into the foam to distribute the clumping agent throughout the foam. The mixed gum-containing clumping agent and foam is then added to solid particulate to adhere the gum-containing clumping agent to the solid particulate.

20 Claims, No Drawings

CLUMPABLE ANIMAL LITTER MIXTURE

This is a continuation-in-part of application U.S. Ser. No. 08/276,516, filed Jul. 15, 1994, now abandoned. U.S. Ser. No. 08/276,516 was a continuation-in-part of U.S. Ser. No. 08/210,026, filed Mar. 16, 1994, now abandoned. U.S. Ser. No. 08/210,026 was a continuation-in-part of U.S. Ser. No. 08/108,950, filed Aug. 18, 1993, now U.S. Pat. No. 5,329,880.

This invention relates to litter materials useful for agglomerating liquid animal waste and coating moist, solid animal waste to form surface dry, coherent clumps of disposable material. In particular, this invention relates to convening non-clumping materials to clumpable materials and to improving the clumpability of clumpable animal litters.

BACKGROUND OF THE INVENTION

Traditionally, water-absorbent clays have been relied on for use as animal litters. The problem with certain of these conventional water-absorbent clays is that they lack the ability to completely absorb noxious odors generated as the waste products biologically break down. Eventually, as the waste products accumulate, the entire litter charge must be replaced to remove the source of the noxious odors.

Recently, "clumpable" animal litters have become a popular method of reducing the build up of waste odors. With clumpable animal litters, urine is agglomerated with an absorbent material into a clump of material that may physically be removed from an animal liner box. Provided the urine clumps and other waste products are periodically scooped away, saturation and objectionable odors are avoided. This clumping aspect also allows only the specific litter affected to be removed, thus a bulk of the litter charge is retained for subsequent use.

To date, there have been essentially two types of clumpable animal litters. The first type of clumpable animal litter contains predominately smectite or other hydrophilic clay types such a bentonite or palygorskite group clays. An example of a bentonite clay-containing cat litter is provided by J. Hughes in U.S. Pat. No. 5,129,365. A problem with smectite clays is that some pet owners ignore instructions not to flush the clumps down a toilet. Water-swellable clays that have a tendency to increase as much as 10 to 14 times by volume can cause severe sewer problems if introduced or concentrated in large enough quantities. Another potential problem with clay-based clumpable animal litters is "dusting" that occurs during the pouring of the litters into the litter box container.

Several additives for improving clumpability of smectite clay have been proposed. G. A. Stuart, in U.S. Pat. No. 4,685,420, discloses the use of a particulate water absorbent polymer in combination with a clay based animal litter for agglomeration. Similarly, T. Fujimori, in Japanese Pat. Publication No. 1-191626 discloses use of an acrylic acid vinyl alcohol copolymer or a sodium acrylate polymer, powdered paper and bentonite mixture for forming clumpable animal litters. J. J. Buschur, in U.S. Pat. No. 5,176,107, discloses use of starch adhesives and organic cellulose compounds. In the Buschur patent, Tamarind gum was reported as being a "satisfactory" adhesive with a poor shelf life and gum arabic was found to be a "poor" adhesive. Similarly, R. F. House, in U.S. Pat. No. 5,188,064 discloses use of cellulosic material such as grains, fruits, cotton, vegetables, nuts, trees, grasses and peat in combination with a smectite clay. Finally, T. M. Kiebke, in U.S. Pat. No. 5,216,980, has recently disclosed use of a semolina wheat additive to clay particles for creating a clumpable cat litter. However, these litters continue to rely upon water swellable clay as the base material.

In addition to the clay-base animal litters, alternate clumpable mixtures have been proposed. For example, H. Wakamiya, in Japanese Pat. Publication No. 63-219323 discloses a mixture of sand and at least 15 wt % ferrous sulfate monohydrate for forming removable clumps. H. R. Loeb, in U.S. Pat. No. 5,152,250, discloses use of granulated peanut shells, flour and mineral oil for holding the mixture together. It is believed that these clay alternatives have not been commercially successful.

It is an object of this invention to provide a composition and method for converting non-clumpable animal litters to clumpable animal litters.

It is a further object of this invention to provide a composition and method for improving clumpability of clumpable animal litter mixtures.

It is a further object of the invention to provide a clumpable animal litter mixture capable of binding all natural materials.

It is a further object of the invention to provide an additive for reducing the amount of bentonite clay in clumpable animal litters.

It is a further object of this invention to provide an animal litter capable of forming durable removable clumps in one minute.

SUMMARY OF INVENTION

The invention provides a clumpable animal litter mixture having about 5 to 50 weight percent bentonite, about 0.1 to 25 weight percent gum-containing clumping agent and balance filler particulate. The gum-containing clumping agent is formed from a plant selected from the group consisting of the Plantago and Cydonia families. The clumpable animal litter mixture is pourable into a litter box and agglomerates into a clump upon contact with urine. The clump of the agglomerated bentonite, gum-containing clumping agent, filler particulate and urine is capable of removal with a perforated scoop after as little as one minute of formation.

The clumpable mixture is formed by introducing the gum-containing clumping agent into a foam. The gum-containing mixture is mixed into the foam to distribute the clumping agent throughout the foam. The mixed gum-containing clumping agent and foam is then added to solid particulate to adhere the gum-containing clumping agent to the solid particulate.

DESCRIPTION OF PREFERRED EMBODIMENT

It has been discovered that gum-containing plantago additives may be added to non-clumping materials to readily convert non-clumping materials into clumpable animal litters and reduce the amount of bentonite required to form clumpable animal litters. The Cydonia family of gum-containing plants is an equivalent of the Plantago family of gum-containing plants..As an equivalent, clumping agents formed from the Cydonia family are expected to perform similarly to plantago clumping agents. For purposes of this specification, gum-containing is defined as polysaccarides or their derivatives from the Plantago or Cydonia families that gel in urine at room temperature or above to form clumps with solid particulate. Ground vegetative material from the Plantago family in particular has been found to form a particularly effective clumping agent.

For purposes of this specification, solid particulate is defined as any solid material that may be agglomerated with animal urine to form a removable clump. Furthermore, the mixture is advantageously pourable, as dry independently flowing particles into a litter container or box. Specific examples of particulate include sineelite clays, bentonite, smectite-free clays, vegetative material, i.e. alfalfa, oat products, wood chips, wood fibers, corn cobs, peanut shells, shale, expanded shale, diatomite and zeolite. Similarly, filler particulate is defined for purposes of the specification as solid particulate other than bentonite. The exact shape of the particulate is not critical. Processed materials may be spherical, cylindrical, tubular, irregular or any other desired shape.

EXAMPLE 1

A series of tests were performed regarding the addition of gum-containing plantago to non-clumping commercial products. Twenty-one tests were performed that involved twenty commercial cat litter products and one commercial floor sweep material. A description of the non-clumping commercial cat litters and other non-clumping materials is provided in Table 1.

cat litters determined by x-ray diffraction.

Initially in the study, the as-received materials were screened, and/or crushed and screened to produce test materials that were −6+16 mesh (−3.35 mm+1.18 mm) and −16+30 mesh (−1.18 mm+0.60 mm) in size. The materials were used as received from consumer packaging without drying. These size fractions were blended in 50:50 weight % proportions to produce the actual 50.0 gram test samples.

Two test series were performed. A first series involved the clumpability of the materials as received without plantago additions; and a second series involved the clumpability of the samples after the following process:

1. The test sample was spread over an approximate 7 inch (17.8 cm) diameter surface (the bottom of an aluminum pie plate).
2. Distilled water (fine mist) was sprayed onto the surface of the particles until 5 wt % was added based upon the 50.0 gram test sample. This process was performed in an estimated 10–15 second time interval.
3. Immediately after the water spray addition, 2.0 wt % Stabilizer (a commercially available source of ground plantago) was added (via a salt shaker containing the plantago) over the surface of the dampened particles.
4. After the additions were complete, the mixes were

TABLE 1

| SAMPLE NO. | BRAND NAME | DESCRIPTION (1) | MAJOR COMPONENTS (wt %) |
|---|---|---|---|
| 1 | Special Kitty Premium | Ground Clay, MS 52040 | NA |
| 2 | Special Kitty | Ground Clay, MS 52020 | NA |
| 3 | Litter Green | Alfalfa and Oat Hull | NA |
| 4 | Pet Club Green | Dehydrated, Pelletized Alfalfa | NA |
| 5 | Kitty Corner | Ground Clay - Natural Clay Product | NA |
| 6 | Fresh Step | Rare deposit of lightweight super absorbent clay | 70% Palygorskite |
| 7 | Cats Pride Original | Ground clay, PO #2311 | 30% Smectite 15–20% Amorphous |
| 8 | Good Day | Ground clay, PO #2376 | NA |
| 9 | Cats Pride Premium | Natural Absorbent Clay Product | 35% Smectite, |
| 10 | Tidy Cat - Multiple | Natural granules plus odor fighters | 35% Opal - CT |
| 11 | Tidy Cat w/baking soda | Natural Granules with odor fighting bi-sulfite complex and baking soda | NA |
| 12 | Jonny Cat | Natural clay from rare deposits | 67% Opal-CT |
| 13 | Kitty Litter Maxx | Natural clay product with deodorizing system | 35-40% Amorphous 20% Smectite, |
| 14 | Trophy - Scented | Ground clay and fragrance | NA |
| 15 | Trophy - Unscented | Ground clay | NA |
| 16 | Pet Cub Scented | Ground clay | NA |
| 17 | Pet Club Natural | Ground clay | NA |
| 18 | Sophista Cat | Ground clay | NA |
| 19 | Kitty Kare Unscented | Natural earth product | NA |
| 20 | Nice and Neat | Highly absorbent | 65% Opal-CT |
| 21 | Big A Floor Sweep | Diatomite (observations using a petrographic microscope - Not noted on bag) | NA |
| 22 | U.S. Zeolite | Zeolite | NA |
| 23 | REALITE* | Expanded shale | NA |
| 24 | First Brands | MF/P-1039 Non-clumping clay | 40% Opal-CT, 25% Sepiolite |

*REALTIE is a trademark of Western Aggregates Inc.
(1) As noted on the bag containing the commercial litter products.
NA Not Available The above "major components (wt %)" represent the major mineralogical constituents of chosen non-clumping placed into paper coffee cups. They were blended by hand until no free Stabilizer was noted visually, then allowed to set under ambient conditions of about 66° F.

(19° C.) overnight.

The clumpability tests for both the material with additive and the material without additive were performed as follows:

1. Four milliliters of test fluid were added to the surface of the materials in the cup using a 50 ml. buret with a drop height of approximately 4–6 inches (10.2–15.2 cm).
2. The cups were allowed to set for 5 minutes under ambient conditions.
3. After the 5 minute setting period, the clumps were removed from the cups with a fork.
4. In some of the tests, the clumps were weighed, and the approximate dimensions of length, width, depth were determined.
5. The clump was placed onto the surface of a slotted commercial litter scoop (Hartz Cat Litter Super Spoon) and the clump was shaken back and forth on the surface of the scoop for 10 seconds (approximately 20 back and forth motions).
6. The condition of the clump was then rated using the following criteria.

TABLE 2

| Rating | Description |
| --- | --- |
| <1 | The clump breaks down during testing into small pieces with no recognizable strength characteristics |
| 1 | The clump breaks into several pieces during testing, but the pieces are reasonably durable. |
| 2 | As No. 3 below, but noticeable degradation is apparent on edges (etc.) |
| 3 | After testing the clump is in one piece with little or no degradation. |

Clumpability tests were also performed on the clumps remaining from the 5 minute tests with plantago, after setting in ambient air (66° F. or 19° C.) on top of the unclumped material in the cups for 4 hours (240 minutes).

Following are the results of these studies (See Table 1 for sample details):

TABLE 3

| Sample No. | CLUMPABILITY | | | CLUMP | | | |
| --- | --- | --- | --- | --- | --- | --- | --- |
| | N/5[1] | W/5[1] | W/240[1] | WT. (g) | Length (cm) | Width (cm) | Depth (cm) |
| 1 | <1 | 2.5 | 3.0 | 17.5 | 2.5 | 2.5 | 1.9 |
| 2 | <1 | 2.5 | 3.0 | 21.3 | 3.2 | 3.2 | 3.8 |
| 3 | <1[2] | <1–1.0 | <1 | 3.0 | 2.5 | 2.5 | 1.0 |
| 4 | | not tested | | — | — | — | — |
| 5 | <1 | 2.5 | 3.0 | 11.2 | 3.2 | 2.5 | 1.9 |
| 6 | <1 | 2.5 | 3.0 | 8.6 | 3.2 | 2.5 | 1.9 |
| 7 | <1 | 1.5 | 3.0 | 9.6 | 2.5 | 2.5 | 1.9 |
| 8 | <1 | 2.5 | 3.0 | 9.9 | 3.8 | 2.5 | 1.9 |
| 9 | <1 | 2.5 | 3.0 | 9.7 | 2.5 | 3.2 | 2.2 |
| 10 | <1 | <1–1.0 | — | — | — | — | — |
| 11 | <1 | 2.5 | 3.0 | 11.1 | 3.2 | 3.2 | 2.2 |
| 12 | <1 | 1.5 | 3.0 | 10.9 | 2.5 | 2.5 | 2.5 |
| 13 | <1 | 2.0–2.5 | 3.0 | 10.5 | 3.2 | 2.5 | 2.5 |
| 14 | <1[2] | 2.0 | 3.0 | 8.5 | 2.5 | 2.5 | 2.5 |
| 15 | <1 | 2.5–3.0 | 3.0 | 11.2 | 3.2 | 3.2 | 2.5 |
| 16 | <1 | 2.5 | 3.0 | 8.9 | 3.2 | 2.5 | 1.9 |
| 17 | <1 | 1.0 | 3.0 | 9.8 | 1.9 | 2.5 | 2.5 |
| 18 | <1[2] | 3.0 | 3.0 | 10.4 | 2.S | 2.5 | 2.5 |
| 19 | <1 | 3.0 | 3.0 | 11.9 | 2.5 | 3.2 | 2.5 |
| 20 | <1 | 0.5–1.0 | 3.0 | 12.0 | 2.5 | 2.5 | 1.9 |
| 21 | <1 | 1.5–2.0 | 3.0 | 5.7 | 1.9 | 2.5 | 1.9 |

NOTE: No. 4 was not tested as it was on alfalfa-based product, similar to Sample No. 3 (which exhibited no appreciable strength gain using plantago and distilled water).
[1]N/5 = No plantago additive; tested 5 min. after water addition.
W/5 = Tested with 2% plantago, 5 min. after water addition.
W/240 = Treated with 2% plantago, 240 min. after water addition.
[2]Sample showed a slight tendency to clump, but the clump was too crumbly for removal.

These data show that the addition of 2 wt % plantago increased clumpability from no-strength (<1) after 5 minutes, to ratings of >1 for all samples tested (except sample 3). Furthermore, all materials studied (except sample no. 3) showed clumpability rating of 3.0 or better after 240 minutes for deionized water.

Example 2

The following data illustrate the clumpability of various non-clumping materials using stabilizer and aged cat urine. The cat urine tested was believed to have aged at least three months prior to testing. The (commercial non-clumping) materials and procedures used were the same as the procedures used for Example 1, except for aged urine being substituted for deionized water.

TABLE 4

| | −6 + 30 Mesh[1] (−3.35 mm + 0.60 mm) Clumpability | | −16 + 30 Mesh (−1.18 mm + 0.60 mm) Clumpability | |
| --- | --- | --- | --- | --- |
| Sample No. | 5 min. | 240 min. | 5 min. | 240 min. |
| 1 | <1 | ND | 1.0 | ND |
| 1[2] | 1.5–2.0 | 3.0 | 2.5 | 3.0 |

TABLE 4-continued

| Sample No. | -6 + 30 Mesh[1] (-3.35 mm + 0.60 mm) Clumpability | | -16 + 30 Mesh (-1.18 mm + 0.60 mm) Clumpability | |
|---|---|---|---|---|
| | 5 min. | 240 min. | 5 min. | 240 min. |
| 2 | <1 | ND | 2.0 | 2.5–3.0 |
| 3 | 2.5–3.0 | 2.5 | 3.0 | 2.5–3.0 |
| 4 | Not Tested | | — | — |
| 5 | <1 | [3] | 2.5 | 2.5–3.0 |
| 6 | <1 | [3] | <1 | ND |
| 6(2) | 1.0–1.5 | 2.5 | <1–1.0 | 1.5 |
| 7 | <1 | 2.5 | 2.0 | 2.5–3.0 |
| 8 | <1 | [3] | 2.0 | 2.5–3.0 |
| 9 | <1 | 2.5 | 3.0 | 2.5–3.0 |
| 10 | 1–1.5 | 2.0 | 2.5–3.0 | 2.5–3.0 |
| 11 | <1 | 3.0 | 1.5 | 2.5–3.0 |
| 12 | <1 | 2.5 | 1.0 | 2.0–5.0 |
| 13 | <1 | 2.0 | 1.0 | 2.0–2.5 |
| 14 | <1 | 2.5 | 2.0–2.5 | 2.5–3.0 |
| 15 | <1 | 2.5 | 1.0 | 2.5–3.0 |
| 16 | <1 | 3.0 | 1.0 | 2.5 |
| 17 | <1 | 2.0–2.5 | 1.0 | 2.5–3.0 |
| 18 | <1 | 2.0 | <1 | 2.5–3.0 |
| 19 | <1 | 3.0 | 1.0 | 2.0–2.5 |
| 20 | <1 | 3.0 | 2.0 | 2.5–3.0 |
| 21 | <1 | [3] | 1.0 | 2.0–2.5 |
| 22 | <1 | [3] | <1 | 2.5–3.0 |

[1] 50% -6 + 16 mesh (-3.35 mm + 1.18 mm) and 50% -16 + 30 m mesh (-1.18 mm + 0.60 mm).
[2] Contained 3 wt % plantago
[3] Samples were still mushy after 4 hours. After air drying overnight, all clumps were 2.0 or better.

At 2 wt % plantago, all of the samples tested having a size distribution of -6+30 mesh (-3.35 mm+0.60 mm), except samples 3 and 10 showed clumpability ratings of <1 after 5 minutes. However, after 240 minutes, 14 of the -6+30 mesh (-3.35 mm+0.60 mm) samples showed clumpability ratings of 2 or better and 5 of the remaining clumps formed moist mushy clumps that were all 2.0 or better after an overnight air drying. At 3 wt % plantago, sample Nos. 1 and 6 had clumpability ratings of 3.0 and 2.5 respectively after 240 minutes.

At a size distribution of -16+30 mesh (-1.18 mm+0.60 mm) and a 2 wt % plantago addition, 18 of the samples tested had a clumpability rating after 5 minutes greater than 1. After 240 minutes, the clumpability of all samples (except Nos. 1 and 6) was 1.5 or greater. At a plantago addition level of 3 wt %, samples Nos. 1 and 6 had clumpability ratings of 3.0 and 1.5 respectively, after 240 minutes.

Example 3

The samples of Table 4 were again tested with relatively "fresh" cat urine with the procedures of Example 1. The cat urine tested had an age of approximately 30 days. Clumpability data relating to tests performed using the fresher cat urine are provided below in Table 5.

TABLE 5

| Sample No. | -6 + 30 m[1] | | -16 + 30 m | |
|---|---|---|---|---|
| | 5 min. | 240 min. | 5 min. | 240 min. |
| 1 | <1–1.0 | 3.0 | 1.5 | 2.5–3.0 |
| 2 | 1.5–2.0 | 1.5–2.0 | 2.0–2.5 | 3.0 |
| 3 | 3.0 | 2.5–3.0 | 3.0 | 3.0 |
| 4 | Not Tested | | | |
| 5 | <1–1.0 | 2.5 | <1–1.0 | 1.0–1.5 |

TABLE 5-continued

| Sample No. | -6 + 30 m[1] | | -16 + 30 m | |
|---|---|---|---|---|
| | 5 min. | 240 min. | 5 min. | 240 min. |
| 6 | <1–1.0 | 2.5 | 2.5–3.0 | 3.0 |
| 7 | <1–1.0 | 2.5 | 1.5–2.0 | 3.0 |
| 8 | <1–1.0 | 3.0 | 2.5–3.0 | 1.0 |
| 9 | <1–1.0 | 3.0 | 2.5–3.0 | 1.0–1.5 |
| 10 | <1–1.0 | 2.0–2.5 | 2.5–3.0 | 2.5–3.0 |
| 11 | <1–1.0 | 2.0–2.5 | 2.5–3.0 | 2.5–3.0 |
| 12 | <1–1.0 | 2.5 | 2.0–2.5 | 2.5–3.0 |
| 13 | <1–1.0 | 2.5 | 2.5–3.0 | 1.0 |
| 14 | <1–1.0 | <1–1.0 | 1.0–1.5 | 1.0–1.5 |
| 15 | <1–1.0 | 1.5–2.0 | 1.0–1.5 | 1.0–1.5 |
| 16 | <1–1.0 | 1.0–1.5 | 1.0–1.5 | 2.0 |
| 17 | <1–1.0 | 2.0 | 3.0 | 3.0 |
| 18 | <1–1.0 | 1.5 | 1.0–1.5 | 1.0–1.5 |
| 19 | <1–1.0 | 2.5 | 2.0–2.5 | 1.0–1.5 |
| 20 | <1–1.0 | 3.0 | 2.5–3.0 | 3.0 |
| 21 | <1–1.0 | <1 | 1.5–2.0 | 3.0 |
| 22 | <1–1.0 | <1–1.0 | 1.5–2.0 | 2.5–3.0 |

[1] 50 wt % -6 + 16 m (-3.35 mm + 1.18 mm); 50 wt % -16 + 30 m (-1.18 mm + 0.60 mm).

In general, the fresh cat urine enhanced clumping performance when compared to similar studies involving aged cat urine. The results of Table 5 indicate that the more recent cat urine tended to clump the -6+30 mesh (-3.35 mm+0.60 mm) samples after 5 minutes better than the older cat urine used in Example 2. Also, samples 1 and 6 clumped with only a 2 wt % plantago addition level with the fresh cat urine. (With aged cat urine, 3 wt % plantago was required to facilitate clumping of samples 1 and 6.) The clumpability rating for all -6+30 mesh (-3.35 mm+0.60 mm) samples at 240 minutes remained equal to or greater than the 5 minutes clumpability results. The clumpability for each of the -16+ mesh (-1.18 mm+0.60 mm) samples at 240 minutes were greater than or equal to all 5 minutes results except for samples 8, 9, 13 and 19.

Example 4

In this Example, tests were performed to determine the effects of various plantago addition levels and size distribution upon the clumpability of lightweight (expanded shale) materials.

The procedures used in this Example were similar to those of Example 1. In this study, the mixes were made and allowed to set in coffee cups overnight, then four milliliters of the aged urine (of Example 2) were added via a plastic syringe. After the urine addition, the samples were allowed to set for the specified period of time, then clump durability tests were performed according to the procedure of Example 1.

TABLE 6

| Sample No. | Size (mesh) | Size (mm) | Wt. % Plantago | Clump Durability 5 min. | Clump Durability 4 hr. |
|---|---|---|---|---|---|
| 23 | -16 + 30 | -1.18 + 0.60 | 2 | 2.5 | 3.0 |
| 23 | -16 + 30 | -1.18 + 0.60 | 3 | 3.0 | 3.0 |
| 23 | -16 + 30 | -1.18 + 0.60 | 4 | 3.0 | 3.0 |
| 23 | -16 + 30 | -1.18 + 0.60 | 5 | 3.0 | 3.0 |
| 23 | -6 + 30 | -3.35 + 0.60 | 2 | 3.0 | 3.0 |
| 23 | -6 + 30 | -3.35 + 0.60 | 3 | 3.0 | 3.0 |
| 23 | -6 + 30 | -3.35 + 0.60 | 4 | 3.0 | 3.0 |
| 23 | -6 + 30 | -3.35 + 0.60 | 5 | 3.0 | 3.0 |

The data of Table 6 indicate that expanded shale in the size ranges of −6+30 mesh (−3.35 mm+0.60 mm) and −16+30 mesh (−1.18 mm+0.60 mm) can be made to clump at plantago additive levels from 2–5%. All samples showed an excellent rating of 3.0 or better for 5 and 240 minutes, except the −16+30 mesh (−1.18 mm+0.60 mm) sample with a rating of 2.5 for the 2 wt % plantago addition.

Example 5

In another test series, the non-clumping clay of sample No. 24 was used with and without stabilizer and with either deionized water or urine. Aged urine was the urine of Example 2 and the fresh urine was the urine of Example 3. The following are the results of the study:

TABLE 7

| Test No. | ml. Added | Fluid Media | Wt. % Addition Stabilizer | Clumpability Rating 5 min. | Overnight |
|---|---|---|---|---|---|
| 1 | 8 | Deionized Water | 2.0(1) | 1.5 | 3.0 |
| 2 | 8 | Aged Urine | 2.0(1) | 1.5 | 3.0 |
| 3 | 8 | Aged Urine | 3.0(1) | 0–1.0 | 3.0 |
| 4 | 4 | Fresh Urine | 3.0(2) | 3.0 | ND |
| 5 | 8 | Aged Urine | 1.9(2) | 2.5 | 3.0 |
| 6 | 4 | Fresh Urine | 2.0(2) | 3.0 | ND |
| 7 | 8 | Aged Urine | 2.0(2) | 2.5 | 3.0 |
| 8 | 8 | Aged Urine | 0 | <1 | ND |
| 9 | 8 | Deionized water | 0 | <1–1 | 0–1 |

(1)Dry Mixed
(2)Mixed by the process of Example 1

These data show that the addition of the plantago at the levels shown positively effected the clumpability of the clay material with water and urine. A comparison of tests 2 and 7, illustrates that improved plantago distribution achieved by using the "wet" addition method of Example 1 improved the clumpability rating from 1.5 to 2.5 after a 5 minute drying time.

Example 6

Forty-one grams of sample No. 11 (Tidy Cat with Baking Soda) having a size of −6+8 mesh (−3.35 mm+2.36 mm) were sprayed with a 10% solution of a commercial product sold as "Soft Sement" (10 pans of Soil Sement in 90 parts of deionized water). (Soil Sement is a commercial name for a dust suppressant produced by Midwest Industrial Supply, Inc.) This was allowed to dry for 2 hours. The material was then sprayed with the solution again (minimal amount), and 2 wt % Stabilizer was sprinkled onto the damp surfaces of the granules. The mass was stirred until no free plantago was noted visually, then it was allowed to set under ambient conditions for 5 minutes. After this setting period, 4 ml of the aged cat urine from Example 2 was added.

After 5 minutes, the clumpability rating was 1.0–1.5 and after 2 hours the rating was 2.5–3.0. After 3 days of air drying, the clumps were very hard and durable (well over a clumpability rating of 3.0). The results of Example 6 indicate that if the surfaces of relatively large size absorptive particles are precoated for improved distribution of clumping agent, they can successfully be agglomerated using gum-containing additive of only 2.0 wt % plantago.

The following procedures were used in the sample preparation and evaluation of Examples 7–11:

Dry Mixing

In this process, dry components (both litter products and additives) were weighted and blended together in the dry state. This process involved adding the dry components to a pan of appropriate size, and mixing the materials by hand (using appropriate spoons, scoops or spatulas) until, visually, the material appeared blended.

The test samples were procured from the mixes by dip-scoop sampling the mixed material. As little "pouring" as possible was used during testing to minimize potential segregation problems.

Water Spray

This process involved dry-mixing, the major components required (as noted above), then spraying the mixed material by hand using a spray bottle. The purpose of this procedure was to produce a damp surface on the granules, then (by use of a salt shaker) sprinkle additive (primarily plantago) onto the damp surfaces. The additive materials stuck onto the surface. Products produced were air dried, and handled as little as possible prior to testing.

Steam

For this procedure, a pressure cooker was outfitted with a spray hose and a needle valve. This procedure involved producing steam in the vessel and discharging steam through a pop-off weight valve using the spray hose to direct steam onto the surface of the material being tested.

Slurry

This procedure involved the production of a water-plantago slurry, then placing dried test material into the slurry. After the addition of the test material, the mass was gently stirred. After the stirring procedure, the material was spread onto an impervious surface and was either allowed to air dry, or was dried with the addition of heat (as-required).

Foam

Two methods of foam generation were utilized in this study. One method involved the addition of a commercial foaming agent (sulfonate in propylene glycol) to water, then blending using a malt mixer. The other method involved the addition of sodium bicarbonate and calcium chloride to water. In these processes, plantago could be added to solutions prior to foaming or could be added to foam produced from the various solutions.

In addition to the shaking test of Example 1, the following testing procedures were used for Examples 7–11.

Drop Test

In this test, clumps were formed by pouring 28 ml of water into litter (the bed being 4"–6" or 10.2–15.2 cm thick) and then covering the wet area with dry litter. The mass was allowed to set for the time period specified before the clump was tested.

At the end of the specified set period, i.e., 1 minute or 15 hours, the clump was removed from the bed and weighed to the nearest tenth of a gram. The clump was then dropped from a height of 11.22" (28.5 cm) onto a device described as follows: a wooden box with inside dimensions of 6"×18" (15.2×45.7 cm). Spaced across the 6" (15.2 cm) dimensions, and running the 18" (45.7 cm) length, were ³⁄₁₆" (0.48 cm) wooden dowel rods, ¼" (0.64 cm) apart (open space). Following the dropping of the clump, the material retained by the dowel rods was re-weighed and the percent weight retained was calculated by the following formula:

$$\% \text{ Weight Retained} = \frac{(\text{Total Weight after Drop})}{(\text{Original Weight})} \times 100$$

Clumps were prepared by pouring 5 ml of water into approximately 200 g of litter and allowing the clump to set for a specified period of time, i.e., 10 seconds, 1 minute, 3 minutes, 3 hours (etc). In this test small clumps were evaluated by pressing them between the thumb and first two digits of the hand. Clumps were removed with the fingers, after being dislodged with a spoon, and pressed until they broke into several pieces.

TABLE 8-continued

| SAMPLE NO. | BRAND NAME | DESCRIPTION |
|---|---|---|
| 30 | Soil Sement Soda | Dust Suppressant |
| 31 | N/A | Tap Water |
| 32 | Stabilizer | >75% Grade Plantago |
| 33 | Scoop Fresh | Clumping Litter (Bentonite) |
| 34 | Calgon | Soap |
| 35 | Shoppers Value | Clumping Litter (Bentonite) |
| 36 | REALITE ® | Expanded Shale |
| 37 | N/A | CaCl₂ Solution |
| 38 | Arm & Hammer Baking Soda | Sodium Bicarbonate |
| 39 | N/A | Deionized Water |
| 40 | Mofoam | Sulfonate in Propylene Glycol |

Mixtures 1–3 were prepared by the Dry Mixing technique. Mixtures 4–6 were prepared by the water spray technique. The percent weight retained after the drop test for various test mixtures is provided in Table 9.

TABLE 9

| Mixture No. | Composition[1] | 1 in. | 3 min. | 5 min. | 10 min. | 15 min. | 1 hr. | 4 hr. | 12 hr. | Moisture Content |
|---|---|---|---|---|---|---|---|---|---|---|
| 1 | 100% (25) | 98.4 | 98.8 | 98.3 | 98.2 | 96.7 | 96.1 | 92.6 | 93.6 | NA |
| 2 | 67.9% (26), 29.1%(27), 3.0%(28) | 63.7 | 81.3 | 88.1 | 88.1 | 87.8 | 93.2 | 89.4 | ND | 14.8 |
| 3 | 67.9%(29), 29.1%(27), 3.0% (28) | (—) | (—) | (—) | 63.9 | 93.0 | 76.6 | 89.1 | ND | 14.2 |
| 4 | 97.0%(29), 3.0%(28) with (30) | (—) | (—) | (—) | (—) | (—) | (—) | 78.9 | ND | 18.4 |
| 5 | 97.0%(29), 3.0%(28) with (31) | (—) | (—) | (—) | (—) | (—) | (—) | 72.4 | ND | 20.3 |
| 6 | 92.0%(29), 5.0%(27), 3%(28) with (30) | (—) | (—) | (—) | (—) | (—) | (—) | 81.8 | ND | 15.2 |

[1]Values in ( ) conewnd to the samples of Table 8.
(—) - Clump too soft for testing.
ND - Not determined.

| RATING | OBSERVATIONS | RECORDED RESULT |
|---|---|---|
| <1 | Not removable with fingers | Fell apart in fingers or crumbled upon being disturbed. |
| 1 | Removable with fingers | Removable with fingers |
| 2 | Can be lightly handled | Soft Clump |
| 3 | Can be handled with moderate finger pressure and breaks into larger pieces | Firm Clump |
| 4 | Breaks into 2–4 large pieces with firm finger pressure | Hard Clump |

Example 7

The materials of Table 8 were used for the further evaluation of plantago-containing clumpable animal litters.

TABLE 8

| SAMPLE NO. | BRAND NAME | DESCRIPTION |
|---|---|---|
| 25 | Scoop Away | Clumping litter |
| 26 | N/A | Zeolite |
| 27 | Precious Cat | Clumping litter (Bentonite) |
| 28 | Kha Kha Grade Psyllium | 75% Grade Ground Plantago |
| 29 | Tidy Cat with Baking | Clay & Baking Soda |

The results of Example 7 illustrate that the commercial product of sample No. 25 had the best strength. Mixture Nos. 1 and 2 containing 29.1% bentonite had superior strength over other mixes that contained only 0–5% bentonite. In addition, mixtures with 29.1% bentonite obtained clumping strength quicker than mixtures containing only 0–5% bentonite. The zeolite content was also believed to contribute to accelerated clumping of the litter. The dust suppressant was not found to significantly affect clumping strength properties.

All of the plantago-containing mixture tested had relatively high moisture prior to testing. It is believed that lower moisture contents would produce improved results. Furthermore, although clumping strength of mixtures 2–6 did not achieve the clumping properties of mixture 1, mixtures 2–6 provided commercially acceptable clumping properties.

Example 8

Example 8 was conducted to determine the effects of particle size and bentonite content upon the durability of clumps when plantago is added by steam application.

Initial attempts at improving plantago bonding to clay by dropping plantago through steam were unsuccessful. A second attempt to use steam involved placing the sample on a #200 sieve (75 μm) and passing steam through the sample from the bottom. Plantago was sprinkled on the sample, with agitation, during the steaming. Following the steaming, the samples were hand sieved over a #30 sieve to determine if a major portion of the plantago had stuck to the sample. In each case, sieving resulted in enough fine materials and a combination of plantago and mineral fines, to indicate very little of the plantago remained in the samples. The mixtures were tested by pouring 5 ml of tap water into a single location of animal litter to form a clump or clumps depending upon the characteristics of the litter being tested. A characterization of the clumps as determined and by the Figure Pressure Test is provided below in Table 10.

distributed the plantago. With the slurry method of distributing plantago, as little as 1 wt % plantago may be used for producing clumps with acceptable long term properties. In comparing mixtures 14 and 15, it was noted that replacing expanded shale fines with zeolite improved clumpability. The addition of Calgon (sodium hexametaphosphate) to the mixtures was not believed to provide any significant impact upon clumping performance.

TABLE 10

| Mixture No. | Composition[1] | 1 Minute | 3 Minutes | 16 Hours |
|---|---|---|---|---|
| 7 | 49.0%(29)*, 19.6%(29)**, 29.4%(33), 2.0%(32) | (3) Firm Rubbery | (3) Firm Rubbery | (3) Firm Rubbery |
| 8 | 39.04%(29)*, 49.0(29)**, 2.0%(32) | (2) Soft | (2) Soft | (2) Soft |
| 9 | 49.0%(29)*, 49.0%(29)**, 2.0%(32)*** | (<1) Fell Apart | (<1) Fell Apart | (<1) Fell Apart |

[1] Values in ( ) correspond to the samples of Table 8
*−8 + 16 M (−2.36 mm + 1.18 mm)
**−16 + 30 M (−1.18 mm + 0.60 mm)
***−200 M (−75 μm)

Only mixes 7 and 8 of Table 10 formed acceptable clumps. Screening plantago to −200 mesh (−75 μm) is believed to diminish clumping capacity of plantago. Greater amounts of −200 mesh (−75 μm) plantago are believed to be capable of forming clumping litter with mixture No. 9. Mixture No. 7 quickly-formed an acceptable clump. However, the steam application method did not prevent plantago segregation and was essentially equivalent to dry mixing.

Example 9

This test was performed to determine the effectiveness of the slurry method for distributing plantago-containing clumping agents. A slurry of plantago, 1 ml of Calgon and 250 ml of hot deionized water was prepared. Portions of the mixtures were added to the slurry, mixed until uniform and then dried. The data of Table 11 were prepared by forming clumps with 5 ml of tap water and using the Finger Pressure Test.

Example 10

A series of tests was performed to evaluate the effectiveness of adding plantago by foam distribution methods.

The mixtures were prepared by the following steps: 1) 5 ml of CaCl solution and 6 grams of Stabilizer brand plantago were added to 50 ml of deionized water and mixed until uniform, 2) 2.5 cm$^3$ of sodium bicarbonate was added to the solution and mixed until foamy, 3) the dry ingredients were added and mixed until uniform, and 4) the mixture was oven dried at a temperature below 200° F. (93.3° C.). The following mixtures were prepared and provided the following test results with the Finger Pressure Test using clumps formed with 5 ml of tap water:

TABLE 11

| Mixture | Composition[1] | 1 Minute | 3 Minutes | 16 Hours |
|---|---|---|---|---|
| 10 | 49.4%(29)*, 49.4%(29)**, 1.2%(32)*** | Water Ran Off | (<1) Fall Apart | No Clump |
| 11 | 49.4%(29)*, 19.8%(29)**, 29.6%(33)**, 1.2%(32)*** | (3) Firm Clump | (3) Firm Clump | (3) Firm Clump |
| 12 | 49.0%(29)*, 39.5%(29)**, 10.0%(33)**, 1.0%(32) | (<1) Fell Apart | (<1) Removed with Spoon | (<1) Crumbled |
| 13 | 49.5%(29)*, 29.5%(29)**, 20.0%(33)**, 1.0%(32) | (1) Removed with Fingers | (1) Removed with Fingers | (3) Firm Easily Broken |
| 14 | 49.5%(36)*, 29.5%(36)**, 20.0%(33)**, 1.0%(32) | (2) Soft Clumps | (2) Soft Clumps | (<1) Crumbled |
| 15 | 49.5%(36)*, 29.5%(26)**, 20.0%(33)**, 1.0%(32) | (3) Firm Clumps | (3) Firm Clump | (3) Firm (Rubbery) |

[1] Values in () correspond to the samples of Table 8
*−8 + 16 M (−2.36 mm + 1.18 mm)
**−16 + 30 M (−1.18 mm + 0.60 mm)
***−200 M (−75 μm)

From Example 9 it was determined that 20% bentonite is the apparent lower limit for acceptable clumping when using only about 1 wt % plantago. The slurry addition effectively

TABLE 12

| Mixture | Composition[1] | 1 Minute | 3 Minutes | 16 Hours |
| --- | --- | --- | --- | --- |
| 16 | 97%(29)*, 3%(32) | Water Ran Off | (<1) Fell Apart | No Clump |
| 17 | 97%(35), 3%(32) | (<1) Fell Apart | (<1) Fell Apart | No Clump |
| 18 | 70%(35), 15%(27)*, 3%(32), 15%(33)** | (3) Firm Clump | (3) Firm Clump | |

[1]Values in ( ) correspond to the samples of Table 8
*−8 + 16 M (−2.36 mm + 1.18 mm)
**−16 + 30 M (−1.18 mm + 0.6 mm)

In a second test, foam was prepared by adding two drops of Mofoam® brand sulfonate in propylene glycol from Midwest Industrial Supply, Inc. and agitating until a stiff foam formed. Plantago was stirred into the foam until the foam became brown colored. Then, non-bentonite clay was mixed with the foam/plantago mixture until a uniform mixture was formed. After the non-bentonite clay was mixed, the bentonite clay was admixed and stirred until it was uniformly distributed. The mixture was then oven dried at a temperature less than 200° F. (93.3° C.). A 5 ml sample of water was added to form clumps that were tested with the Finger Pressure test as follows:

TABLE 13

| Mixture | Composition[1] | Immediate | 3 Minutes | 16 Hours |
| --- | --- | --- | --- | --- |
| 19 | 68% (35), 15%(27)*, 15%(33)**, 2% (32) | (3) Firm Clump | (3) Firm Clump | (4) Hard Clump |

[1]Values in () correspond to the samples of Table 8.
*−8 + 16 M (−2.36 mm + 1.18 mm)
**−16 + 30 M (−1.18 mm + 0.6 mm)

The above method of using the sulfonate in propylene glycol foaming agent appeared to completely and uniformly distribute the clumping agent. The foam carrier did not decrease the long term clumping ability of mixture 19. Furthermore, the foam almost completely eliminated the dusting arising from Shoppers Value bentonite clay.

Example 11

A series of 14 zeolite/bentonite/plantago clumpable animal litters were prepared by the foam method using sulfonate in propylene glycol. The compositions and moisture contents are for the mixtures are given below in Table 14:

TABLE 14

| MIXTURE NO. | ZEOLITE/BENTONITE RATIO | WT % PLANTAGO | MOISTURE CONTENT (WT %) |
| --- | --- | --- | --- |
| 19 | (C) 70/30 (F) | 2.0 | 10.0 |
| 20 | (M) 70/30 (F) | 2.0 | 13.3 |
| 21 | (M) 70/30 (F) (after 7 days in closed and open buckets) | 2.0 | 12.3 |
| 22 | (C) 80/20 (F) | 2.6 | 10.8 |
| 23 | (M) 61.5/38.5 (F) | 1.8 | 11.7 |
| 24 | (M) 55/45 (C) | 1.6 | 9.6 |
| 25 | (M) 70/30 (C) | 2.0 | 13.6 |
| 26 | (M) 70/30(F) | 2.0 | 13.3 |
| 27 | (M) 70/30 (F) | 0.0 | 13.5 |
| 28 | (C) 80/20 (F) | 2.6 | 10.8 |
| 29 | (M) 70/30 (C) | 1.6 | 10.0 |
| 30 | (C) 80/20 (F) | 2.6 | 10.8 |
| 31 | (C) 80/20 (F) | 2.0 | 10.0 |
| 32 | (C) 100/0 | 0.0 | 15.7 |

C = Coarse; −8 + 14 Mesh (−2.35 + 1.40 mm)
F = Fine; −14 + 30 Mesh (−1.40 + 0.60 mm)
M = Mix of 50:50 Coarse: fine All the samples of Table 14 produced clumps that could be removed one minute after formation. Mixtures 19–28 retained greater than 93% of their weight when given the drop test. However, the clumps of samples 24 to 28 were not as firm as the clumps of samples 19 to 23. Samples 29 to 32 had less than 93% retained weight when given the drop test. From the present Example, it was determined that a combination of bentonite for rapid clump formation and plantago for durability provides the optimum results.

Gum-containing Plantago or Cydonia family plants, that gels at room temperature, are preferably used as the clumping agent. Specifically, Plantago or Cydonia family gum-containing clumping agent in an amount of about 0.1 to 25 weight percent provides improved clumpability of particles. Advantageously, about 0.25 to 15 weight percent Plantago or Cydonia family gum-containing agent is added for providing clumpability to non-clumping materials. Most advantageously, about 0.5 to 10 weight percent Plantago or Cydonia family clumping agent is added. When the particulate used possesses inherent clumping qualities, such as hydrophilic shale or bentonite, less gum-containing Plantago or Cydonia family clumping agent is required. Tests wherein plantago was mixed with commercially available clumping litter products have improved clumping characteristics where improved clumping was possible. Plantago has also been found to improve clumpability of mixtures of raw shale and zeolite that have an inherent ability to clump.

It is noted that pure plantago will clump animal urine. However, for cost reasons, it is necessary to combine plantago with solid particulate. Tests of 95% and 85% psyllium seed husk and a lesser grade Psyllium dust, sold as Kha-Kha powder, all provided approximately equal clumping results. For cost reasons, gum-containing clumping agent is advantageously limited to about 15 wt %. Most advantageously, gum-containing clumping agent is limited to about 10 wt %. The gum-containing litter clumps tend to gain strength during air drying. After one day of air drying, gum-containing litter clumps are generally extremely strong and durable. Most advantageously, clumps are removable after only one minute of air drying. Most advantageously, the gum arises from ground plantago (Family-Plantaginaces, Genera-Plantago, species, P. Major). Specific species commercially available include Plantago ovata Forsk of the "blonde psyllium" and Plantago psyllium L. of the "black" psyllium.

The plantago may be added to the clay by a variety of methods. When using the less efficient methods of adding plantago, such as dry mixing, a greater amount of plantago is required to compensate for less than perfect distribution of the plantago. The foam application method has proven to be the most effective method of adding plantago. Most advantageously, the foam is made with a foaming agent such as sulfonate in propylene glycol or dioctyl succonate. Without the foam application of plantago, settling of Plantago during shipping and handling is a problem. Initial testing has proven that the foam may readily be formed with a pressurized nozzle. The foam may then be mixed with plantago and solid particulate in a horizontal screw to form the clumpable mixture.

Alternatively, ammonia absorbing zeolite in amounts up to about 80 weight percent may be added for odor control. The zeolite absorbs ammonia to reduce transfer of ammonia carried odors. The zeolite provides some contribution to prompt clumpability of the animal litter. Synthetic zeolites such as Zeolitter 5205-PF sold by Engelhard may also be added for odor control.

Advantageously, the particulate material used is screened to remove fines that tend to cause dusting during pouring when required. (With some organic particulate, dusting is not a problem.) Limiting the particulate to +30 mesh (600 microns) or 50 mesh (300 microns) tends to provide effective dust control. The most preferred size distribution is −16 mesh (1,180 microns) or −8 mesh (2360 microns) to +30 mesh (600 microns) or +50 mesh (300 microns). To avoid sewer damage, smectite-free clays are advantageously used. For silica-free mixtures, organics such as alfalfa pellets are advantageously used with the gum-containing clumping agent.

During testing it was noted that, plantago-containing clumps harden over time into very tough durable clumps. It was further discovered that this time of gaining clump strength may be shortened by including bentonite in the mixture. A combination of bentonite and plantago allows a durable clump to be removed one minute after formation. An addition of about 5 to 50 weight percent bentonite may be advantageously added to facilitate immediate clump strength. Most advantageously, about 10 to 45 weight percent bentonite is added to facilitate immediate clump strength. Plantago in combination with an addition of at least about 15 wt % bentonite, has been found to be effective for quickly forming durable clumps within one minute. In particular, an addition of at least about 15 wt % bentonite is particularly useful for obtaining a value of at least 93% weight retained for the drop test specified for Examples 7 and 11.

The invention provides several advantages over known clumpable animal litters. The mixture has the ability to convert various non-clumping materials such as clays, alfalfa and expanded shale into clumpable litter. Furthermore, the mixture facilitates clumpability and strength of inherently clumpable mixtures. The invention also provides the ability to clump silica-free organics such as alfalfa. In addition, the invention allows effective clumping with reduced amounts of bentonite. However, a relatively small amount of bentonite may optionally be added to improve rapid clumping performance. Finally, the invention allows removal of clumps as quickly as one minute after formation, depending upon the particulate and the amount of clumping agent used.

While in accordance with the provisions of the statute, there is illustrated and described herein specific embodiments of the invention. Those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. A clumpable animal litter comprising about 5 to 50 weight percent bentonite, about 0.1 to 25 weight percent gum-containing clumping agent formed from a plant selected from the group consisting of the Plantago and Cydonia family and balance filler particulate, said clumping agent being distributed with said bentonite and said filler particulate to form a clumpable mixture, said clumpable mixture having the properties of being pourable into a litter box and agglomerating into a clump upon contact with urine, and the clump of said agglomerated bentonite, gum-containing clumping agent, filler particulate and urine being capable of physical removal with a perforated scoop after formation.

2. The clumpable animal litter of claim 1 wherein said filler particulate is selected from the group consisting of smectite-free clays, smectite-containing clays, vegetative material, shale, expanded shale, diatomite and zeolite.

3. The clumpable animal litter of claim 1 wherein said clumping agent is from a plant of the Plantago family.

4. The clumpable animal litter of claim 1 wherein said clumpable mixture contains about 0.25 to 15 weight percent dried plantago agglomerating agent.

5. The clumpable animal litter of claim 1 wherein said filler particulate is ammonia absorbing zeolite.

6. The clumpable animal litter of claim 1 wherein said particulate contains about 10 to 45 weight percent bentonite.

7. The clumpable animal litter of claim 1 wherein said gum-containing clumping agent is distributed in said particulate with foam.

8. A clumpable animal litter comprising about 10 to 45 weight percent bentonite, about 0.25 to 15 weight percent gum-containing clumping agent formed from the Plantago family and balance filler particulate, said clumping agent being distributed with said bentonite and said filler particulate to form a clumpable mixture, said clumpable mixture having the properties of being pourable into a litter box and agglomerating into a clump upon contact with urine, and the clump of said agglomerated bentonite, gum-containing clumping agent, filler particulate and urine being capable of physical removal with a perforated scoop after one minute of formation.

9. The clumpable animal litter of claim 8 wherein said particulate is selected from the group consisting of smectite-free clays, smectite-containing clays, vegetative material, shale, expanded shale, diatomite and zeolite.

10. The clumpable animal litter of claim 8 wherein said mixture of shale contains about 0.5–10% by weight percent dried plantago agglomerating agent and said clumpable mixture contains at least 15 weight percent bentonite.

11. The clumpable animal litter of claim 8 wherein said filler particulate is ammonia absorbing zeolite.

12. The clumpable animal litter of claim 8 wherein said gum-containing clumping agent is distributed in said clumpable mixture with foam.

13. The clumpable animal litter of claim 8 wherein said foam is formed with sulfonate in propylene glycol.

14. The clumpable animal litter of claim 8 wherein a clump formed with 28 ml of water and said clumpable mixture maintains at least about 93 percent weight retention when dropped from a height of 28.5 cm.

15. A method of forming clumpable animal litter comprising the steps of:
introducing a gum-containing clumping agent into a foam, said gum-containing mixture being formed from a plant selected from the group consisting of the Planmgo and Cydonia family,
mixing said gum-containing clumping agent into said foam to distribute said clumping agent throughout said foam, adding said mixed gum-containing clumping agent and foam to solid particulate to adhere said gum-containing clumping agent to said solid particulate.

16. The method of claim 15 wherein said solid particulate adhered to said clumping agent is selected from the group consisting of smectite-free clays, smectite-containing clays, vegetative material, shale, expanded shale, diatomite and zeolite.

17. The method of claim 15 wherein said clumping agent mixed with said foam is about 0.25 to 15 weight percent plant of the Plantago family.

18. The method of claim 17 wherein said solid particulate adhered to said clumping agent contains about 5 to 50 weight percent bentonite.

19. The method of claim 17 said solid particulate adhered to said clumping agent contains about 10 to 45 weight percent bentonite and balance ammonia absorbing zeolite.

20. The method of claim 15 wherein said foam mixed with said gum-containing agent is formed with sulfonate in propylene glycol.

* * * * *